(12) United States Patent
Oku

(10) Patent No.: US 8,749,718 B2
(45) Date of Patent: Jun. 10, 2014

(54) VIDEO DISPLAY APPARATUS AND VIDEO DISPLAY METHOD

(75) Inventor: Kentaro Oku, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/304,113

(22) Filed: Nov. 23, 2011

(65) Prior Publication Data

US 2012/0268662 A1  Oct. 25, 2012

(30) Foreign Application Priority Data

Apr. 21, 2011 (JP) .................................. 2011-094891

(51) Int. Cl.
*H04N 9/12* (2006.01)

(52) U.S. Cl.
USPC ............................ 348/739; 348/553; 348/569

(58) Field of Classification Search
USPC ......... 348/739, 725, 563–565, 569, 552, 734; 725/9–21, 78
IPC ...................................................... H04N 9/12
See application file for complete search history.

(56) References Cited

U.S. PATENT DOCUMENTS

| 2007/0030595 A1* | 2/2007 | Tsukamoto | ................... 360/135 |
| 2012/0143031 A1* | 6/2012 | Belalcazar et al. | ........... 600/377 |

FOREIGN PATENT DOCUMENTS

| JP | 2-146628 | 1/1990 | |
| JP | 10-143787 | 5/1998 | |
| JP | 2000-011282 | 1/2000 | |
| JP | 2000-069390 | 3/2000 | |
| JP | 2000-125020 | 4/2000 | |
| JP | 2000-293774 | 10/2000 | |
| JP | 2001-028644 | 1/2001 | |
| JP | 2001-127896 | 5/2001 | |
| JP | 2002-092763 | 3/2002 | |
| JP | 2002-099978 | 4/2002 | |
| JP | 2002-261966 | 9/2002 | |
| JP | 2002-314714 | * 10/2002 | ............... H04N 5/00 |
| JP | 2003-263523 | 9/2003 | |
| JP | 2004-007528 | 1/2004 | |
| JP | 2005-134969 | 5/2005 | |
| JP | 2008-159213 | 7/2008 | |
| JP | 2009-123086 | 6/2009 | |
| JP | 2010-020787 | 1/2010 | |
| JP | 2010-141445 | 6/2010 | |

OTHER PUBLICATIONS

Japanese Patent Application No. 2011-094891, Notification of Reasons for Refusal, mailed Feb. 14, 2012, (with English Translation).
Japanese Patent Application No. 2011-094891, Notification of Reasons for Refusal, mailed Apr. 24, 2012, (with English Translation).

* cited by examiner

*Primary Examiner* — Trang U Tran
(74) *Attorney, Agent, or Firm* — Blakely, Sokoloff, Taylor & Zafman LLP

(57) ABSTRACT

According to one exemplary embodiment, a video display apparatus includes: an inquiry picture output module which detects a time for which no operation of the video display apparatus has been made, and which outputs, to a video display module, an inquiry picture through which an instruction to or not to make a transmission is to be given if the detected non-operation time is longer than a preset time; and a transmitter which makes the transmission to a preset transmission destination if the instruction to make the transmission is given through the inquiry picture.

7 Claims, 5 Drawing Sheets

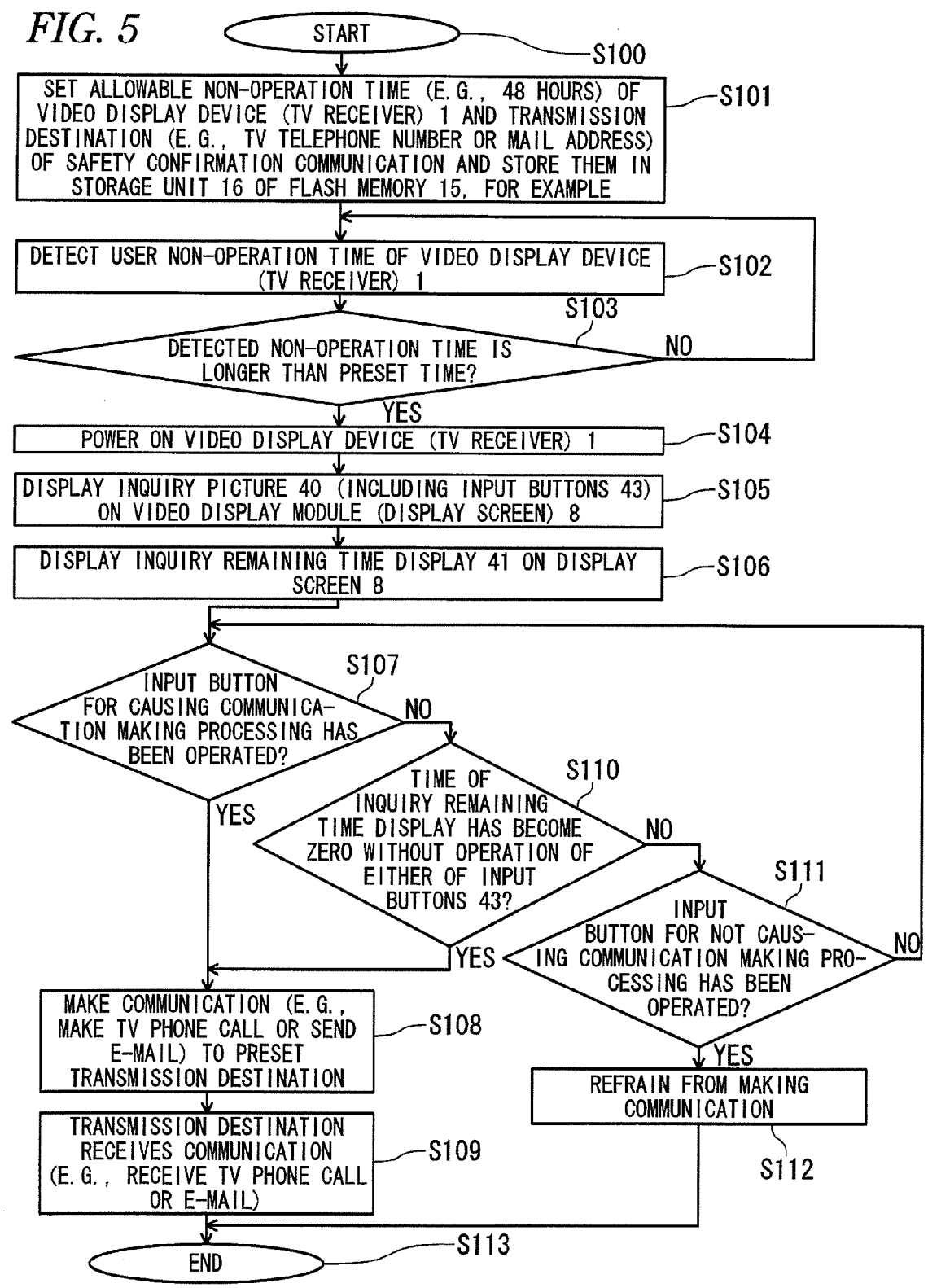

VIDEO DISPLAY APPARATUS AND VIDEO DISPLAY METHOD

CROSS REFERENCE TO RELATED APPLICATION(S)

The application is based upon and claims the benefit of priority from Japanese Patent Application No. 2011-094891 filed on Apr. 21, 2011; the entire content of which are incorporated herein by reference.

FIELD

Exemplary embodiments described herein relate generally to a video display apparatus and a video display method.

BACKGROUND

In recent years, households of a single or a small number of old persons, persons who require nursing care have been increasing. Therefore, close relatives who are living in distant places have a desire to confirm safety of such persons satisfactorily.

However, for example, asking old persons or persons who require nursing care their health in an excessive manner may invade their privacy. It is therefore desired to satisfy both of confirming safety of old persons or the like satisfactorily and protecting their privacy.

BRIEF DESCRIPTION OF THE DRAWINGS

Exemplary embodiments of the present invention will be described in detail based on the following figures, wherein:

FIG. 5 is a flowchart of a process which is executed by the video display apparatus.

DETAILED DESCRIPTION OF THE EXEMPLARY EMBODIMENTS

In general, according to one exemplary embodiment, a video display apparatus includes: an inquiry picture output module which detects a time for which no operation of the video display apparatus has been made, and which outputs, to a video display module, an inquiry picture through which an instruction to or not to make a transmission is to be given if the detected non-operation time is longer than a preset time; and a transmitter which makes the transmission to a preset transmission destination if the instruction to make the transmission is given through the inquiry picture.

An embodiment will be hereinafter described with reference to the drawings.

Figure 1:
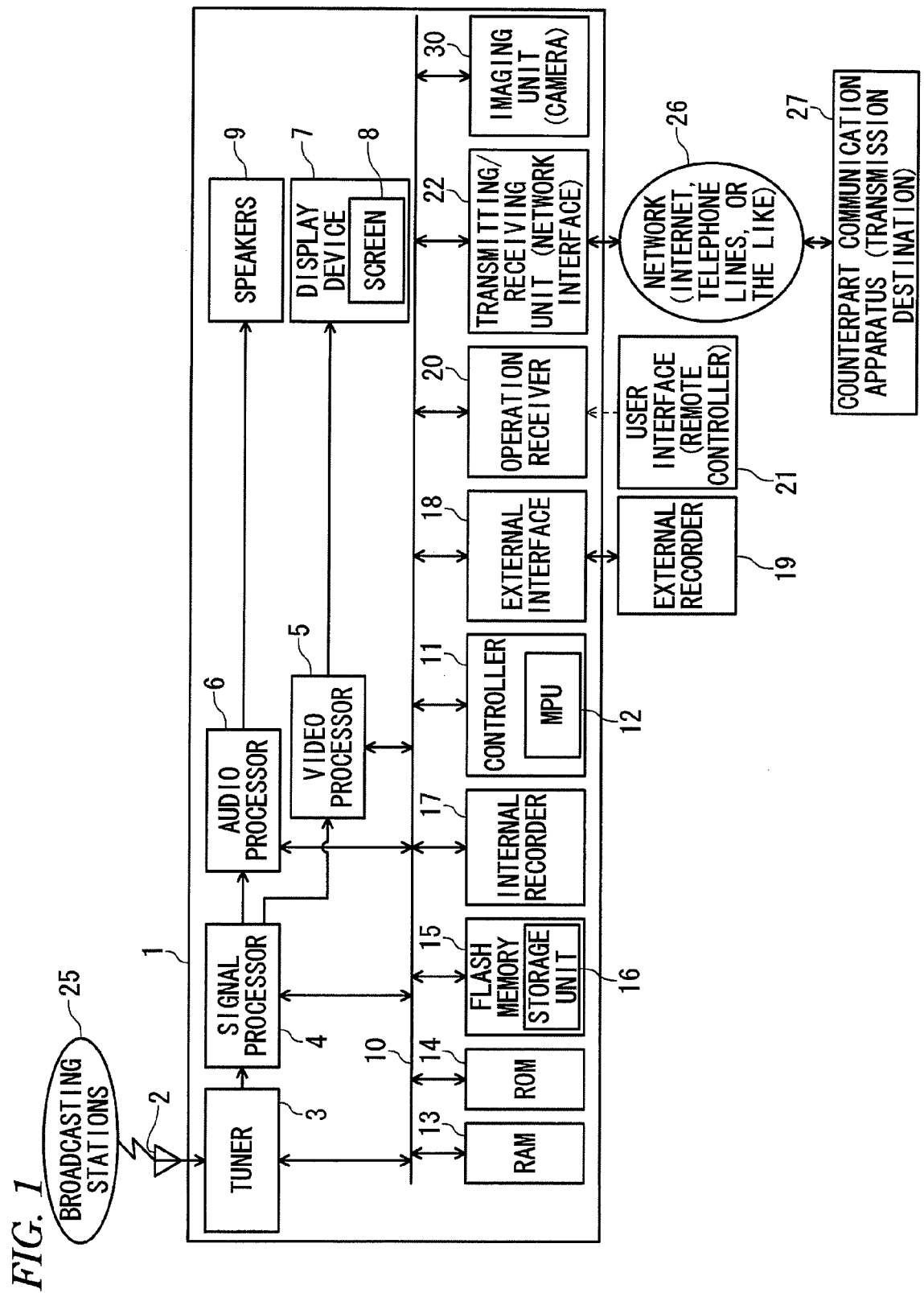
FIG. 1 is a block diagram showing an example configuration of a video display apparatus according to an embodiment.

FIG. 1 is a block diagram showing an example configuration of a video display apparatus 1 according to the embodiment. The video display apparatus 1 is, for example, a TV receiver. The video display apparatus 1 includes: an antenna 2; a tuner 3; a signal processor 4; a video processor 5; an audio processor 6; a display device 7; a display screen (video display module) 8; speakers 9; a bus 10; a controller 11; an MPU 12; a RAM 13; a ROM 14; a flash memory 15; a storage unit 16; an internal recorder 17; an external interface 18; a operation receiver 20; and a transmitting/receiving unit (interface for a network or the like) 22. Further, as shown in FIG. 1, an external recorder 19, a user interface (remote controller) 21, broadcasting stations 25, a network (the Internet, telephone lines, or the like) 26, and a counterpart communication apparatus 27 of video telephone or e-mail are provided.

The controller 11 has the MPU 12 and controls the video display apparatus 1. The RAM 13, the ROM 14, and the flash memory 15 are used for processing that is performed by the controller 11, for example.

For example, digital broadcasts of video contents are broadcast from the broadcasting stations 25. The tuner 3 tunes in to one of the digital broadcasts that are transmitted from the broadcasting stations 25, and outputs a digital signal of the selected video content to the signal processor 4.

The signal processor 4 performs signal processing on the digital signal of the selected video content, and outputs resulting signals to the audio processor 6 and the video processor 5.

The audio processor 6 performs audio processing on the received signal of the video content and outputs resulting signals to the speakers 9. The speakers 9 produce a sound based on the received signals.

The video processor 5 performs video processing on the received signal of the video content and outputs a resulting signal to the display device 7. The display device 7 displays video on the display screen (video display module) 8 consisted of an LCD panel or the like based on the received signal.

In the embodiment, the video display apparatus 1 has the internal recorder 17 and can record the received video content there.

In the embodiment, the external recorder 19 is USB-connected or LAN-connected to the video display apparatus 1. The received video content can also be recorded in the external recorder 19.

The user inputs an operational instruction to the video display apparatus 1 through the user interface 21 such as a remote controller.

The above pieces of processing are controlled by the controller 11. For example, the transmitting/receiving unit (interface for a network or the like) 22 of the video display apparatus 1 is connected to the counterpart communication apparatus 27 of video telephone or e-mail via the network (the Internet, telephone lines, or the like) 26, and makes a TV phone call or sends an e-mail to the counterpart communication apparatus 27 which is a preset transmission destination. A transmission destination is set (input) in advance by the user (details are not shown) and stored in, for example, the storage unit 16 of the flash memory 15.

In the embodiment, the video display apparatus 1 is provided with an imaging device (camera) 30. The imaging device 30 is used for shooting what are located in front of the video display apparatus 1, and a resulting image is used for TV phone call.

Figure 2:
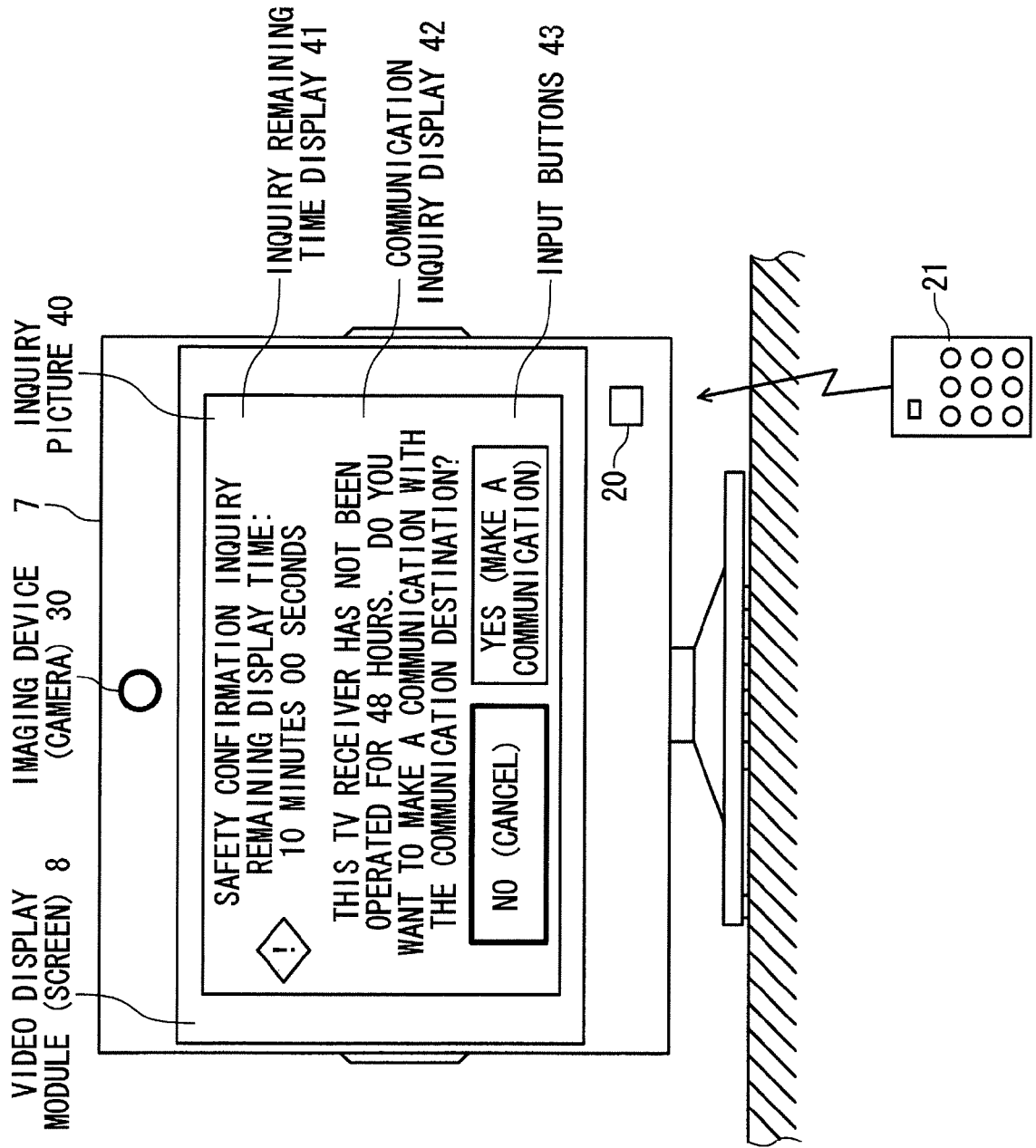
FIG. 2 shows an example appearance of the video display apparatus.

FIG. 2 shows an example appearance of the video display apparatus 1 according to the embodiment.

In the embodiment, the video display apparatus 1 detects a user non-operation time, that is, a time during which the video display apparatus 1 has not been operated by the user. For example, this is done in such a manner that the MPU 12 of the controller 11 observes a power source (not shown) of the video display apparatus 1 and detects a time during which the power of the video display apparatus 1 is off.

Information relating to an allowable power-off time of the video display apparatus 1 is preset (input) in advance by the user (details are not shown) and stored in, for example, the storage unit 16 of the flash memory 15.

The allowable power-off time of the video display apparatus 1 is set at 48 hours, for example. The allowable power-off time of the video display apparatus 1 can be changed by the user as appropriate and can be set at 24 hours, one week, one month, three months, or the like.

Alternatively, the deadline of the allowable power-off time may be set in a regular manner at AM 7:00 of every day, AM 7:00 of every Sunday, AM 7:00 of the first day of every month, or the like.

In the embodiment, a detected non-operation time is compared with the preset allowable power-off time. If the detected non-operation time is longer than the allowable power-off time, in inquiry picture that inquires of the user whether to, for example, make a TV phone call or send an e-mail is displayed on the video display module 8.

In FIG. 2, reference numeral 40 denotes an example inquiry picture which is displayed on the video display module (display screen) 8 as a pop-up picture, for example.

As shown in FIG. 2, for example, the inquiry picture 40 includes an inquiry remaining time display 41, a communication inquiry display 42, and input buttons 43.

The communication inquiry display 42 is an inquiry "This TV receiver has not been operated for 48 hours. Do you want to make a communication with the communication destination?" That is, in this example, the communication inquiry display 42 is displayed when a non-operation time (mentioned above) of the video display apparatus 1 has reached or exceeded 48 hours which is set in advance.

The input buttons 43 are displays for urging the user to make an input. In this example, the input buttons 43 are buttons to be operated to answer the inquiry "Do you want to make a communication with the communication destination?"

In this example, the input buttons 43 are a "Yes (Make a communication)" button and a "No (Cancel)" button. The user makes an input by operating one of the input buttons 43 through the user interface 21, for example. The user may be in such a situation as to be able to operate neither the "Yes (Make a communication)" button nor the "No (Cancel)" button.

For example, the inquiry remaining time display 41 indicates a remaining display time of the communication inquiry display 42 and the input buttons 43 of the inquiry picture 40. In this example, the inquiry remaining time display 41 is "Safety confirmation inquiry remaining display time: 10 minutes 00 seconds." The time for which the inquiry remaining time display 41 has been displayed is measured by a timer (not shown) and the displayed time is varied. The initial time of the inquiry remaining time display 41 can be set (input) in advance by the user and stored in, for example, the storage unit 16 of the flash memory 15.

For example, if the user operates the "Yes (Make a communication)" button, the transmitting/receiving unit 22, for example, performs transmission processing that is directed to the preset transmission destination.

If the user operates the "No (Cancel)" button, no transmission processing that is directed to the preset transmission destination is performed.

In the embodiment, if the user has operated neither the "Yes (Make a communication)" button nor the "No (Cancel)" button even when the initial time (in this example, 10 minutes) of the inquiry remaining time display 41 has elapsed, the transmitting/receiving unit 22 performs transmission processing that is directed to the preset transmission destination.

Figure 3:
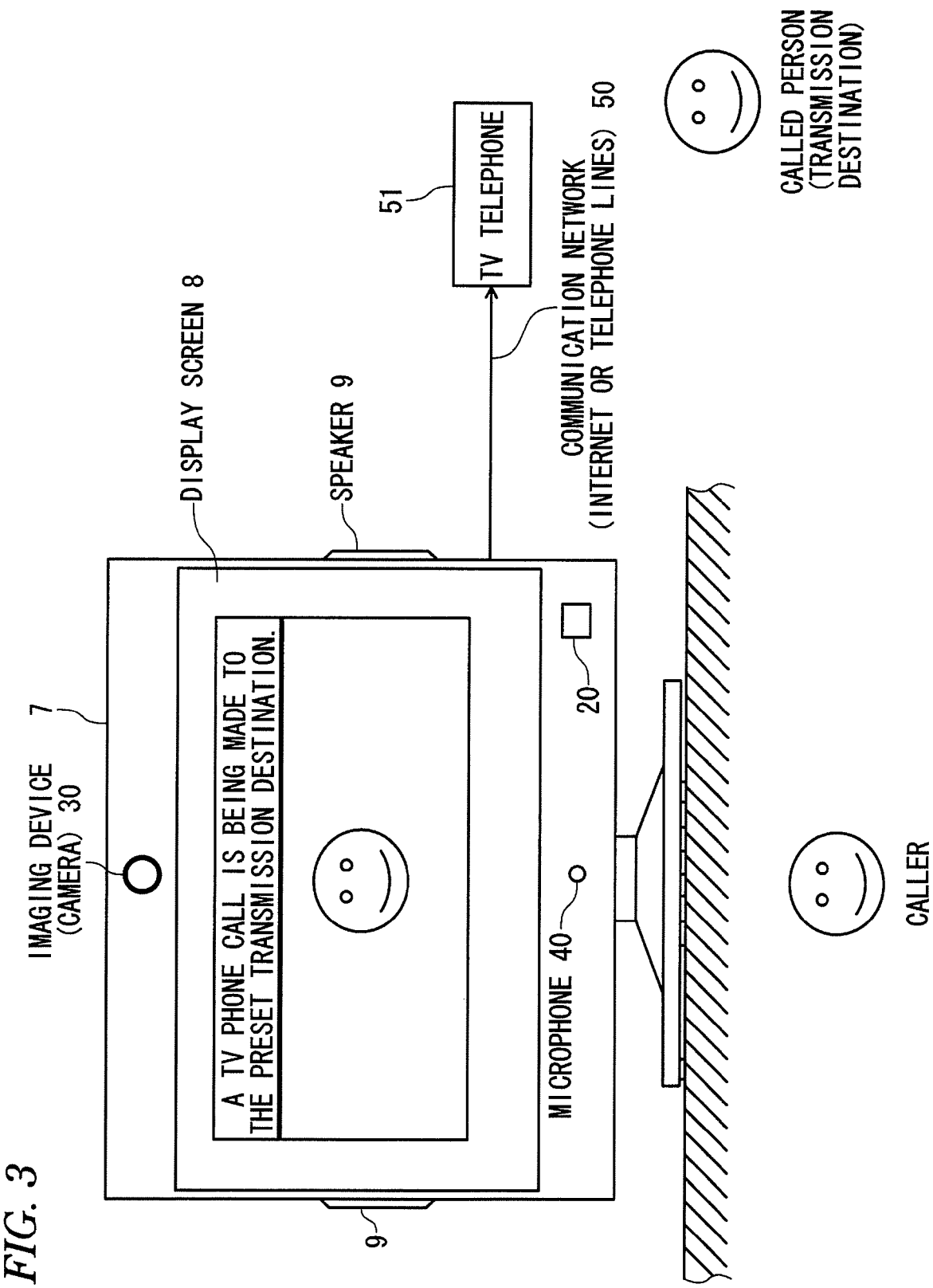
FIG. 3 shows how a TV phone call is made by the video display apparatus.

FIG. 3 shows how a TV phone call is made by the video display apparatus 1 according to the embodiment.

As described above, the communication inquiry display 42 is displayed on the video display module 8 of the video display apparatus 1 when, for example, a user non-operation time has exceeded the preset time. If the user operates the "Yes (Make a communication)" button or has not operated neither the "Yes (Make a communication)" button nor the "No (Cancel)" button even when the initial time of the inquiry remaining time display 41 has elapsed, the transmitting/receiving unit 22 of the video display apparatus 1 originates a TV phone call to the preset transmission destination. In this manner, a TV phone call to the preset transmission destination is originated automatically over the communication network 50 and a TV phone conversation is enabled.

As shown in FIG. 3, a scene in front of the video display apparatus 1 is captured by the imaging device (camera) 30 and a voice generated around the video display apparatus 1 is picked up by a microphone 40, and a resulting signal is transmitted to the preset transmission destination (e.g., TV telephone 51) over a communication network 50 by video telephone.

The transmission destination receives the transmitted video and voice and can recognize that this communication is for, for example, confirmation of safety. The user at the transmission destination can recognize a situation in front of the video display apparatus 1 by viewing the video.

As described above, in the embodiment, the input buttons 43 are displayed for, for example, confirmation of safety and the user (e.g., an old person or a person who requires nursing care) operates the "Yes (Make a communication)" button or the "No (Cancel)" button to decide whether to make a communication.

As a result, invasion of the privacy of the user (e.g., an old person or a person who requires nursing care) can be prevented.

In the embodiment, if the user in such a situation as to be able to operate neither the "Yes (Make a communication)" button nor the "No (Cancel)" button of the input buttons 43, safety-related information or the like is transmitted to the preset transmission destination by video telephone, for example.

This enables satisfactory confirmation of safety.

Figure 4:
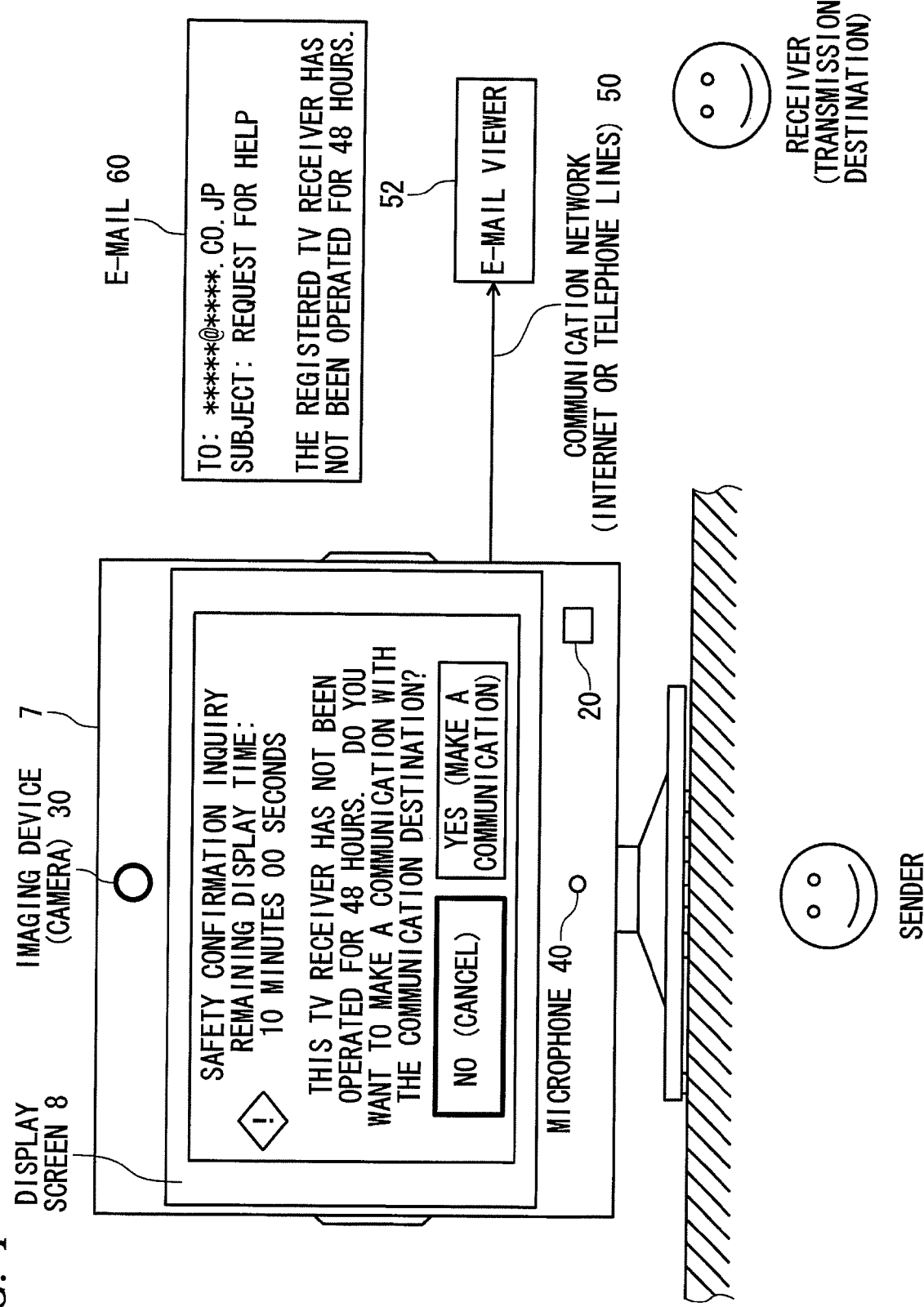
FIG. 4 shows how an e-mail is sent by the video display apparatus.

FIG. 4 shows how an e-mail is sent by the video display apparatus 1 according to the embodiment.

In the embodiment, as in the case of video telephone, an inquiry picture 40 is displayed on the video display module (display screen) 8. For example, the inquiry picture 40 includes an inquiry remaining time display 41, a communication inquiry display 42, and input buttons 43.

The communication inquiry display 42 is an inquiry "This TV receiver has not been operated for 48 hours. Do you want to make a communication with the communication destination?" That is, also in this example, the communication inquiry display 42 is displayed when a non-operation time (mentioned above) of the video display apparatus 1 has reached or exceeded 48 hours (set in advance).

The input buttons 43 are displays for urging the user to make an input. In this example, the input buttons 43 are a "Yes (Make a communication)" button and a "No (Cancel)" button. The user makes an input by operating one of the input buttons 43 through the user interface 21, for example. The user may be in such a situation as to be able to operate neither the "Yes (Make a communication)" button nor the "No (Cancel)" button.

For example, the inquiry remaining time display 41 indicates a remaining display time of the communication inquiry display 42 and the input buttons 43 of the inquiry picture 40.

In this example, the inquiry remaining time display 41 is "Safety confirmation inquiry remaining display time: 10 minutes 00 seconds."

For example, if the user operates the "Yes (Make a communication)" button, the transmitting/receiving unit 22 performs transmission processing for sending an e-mail 60 to the preset transmission destination.

If the user operates the "No (Cancel)" button, no transmission processing for sending an e-mail 60 to the preset transmission destination is performed.

In the embodiment, if the user has operated neither the "Yes (Make a communication)" button nor the "No (Cancel)" button even when the initial time (in this example, 10 minutes) of the inquiry remaining time display 41 has elapsed, the transmitting/receiving unit 22 performs transmission processing for sending an e-mail 60 to the preset transmission destination.

If the user operates the "Yes (Make a communication)" button or has not operated neither the "Yes (Make a communication)" button nor the "No (Cancel)" button even when the initial time of the inquiry remaining time display 41 has elapsed, the transmitting/receiving unit 22 of the video display apparatus 1 sends an e-mail 60 to the preset transmission destination.

In this example, as shown in FIG. 4, the e-mail 60 is transmitted to the preset transmission destination (e.g., e-mail viewer 52). The transmission destination (e.g., e-mail viewer 52) receives the e-mail 60, and the user at the transmission destination can recognize that this communication is for, for example, confirmation of safety.

As described above, in the embodiment, the input buttons 43 are displayed for, for example, confirmation of safety and the user (e.g., an old person or a person who requires nursing care) operates the "Yes (Make a communication)" button or the "No (Cancel)" button to decide whether to make a communication.

As a result, invasion of the privacy of the user (e.g., an old person or a person who requires nursing care) can be prevented.

In the embodiment, if the user in such a situation as to be able to operate neither the "Yes (Make a communication)" button nor the "No (Cancel)" button of the input buttons 43, safety-related information or the like is transmitted to the preset transmission destination by e-mail, for example.

This enables satisfactory confirmation of safety.

FIG. 5 is a flowchart of a process which is executed by the video display apparatus (TV receiver) 1 according to the embodiment.

The process starts at step S100. At step S101, an allowable non-operation time (e.g., 48 hours) of the video display apparatus 1 and a transmission destination (e.g., TV telephone number or a mail address) of a safety confirmation communication are set and stored in the storage unit 16 of the flash memory 15, for example. The kind of safety confirmation communication is not limited to video telephone and e-mail and may be facsimile, telephone, or the like.

At step S102, a user non-operation time of the video display apparatus (TV receiver) 1 is detected by, for example, detecting a power-off time of the video display apparatus 1.

At step S103, it is determined whether or not the detected user non-operation time is longer than the preset allowable non-operation time (e.g., 48 hours). The allowable non-operation time (power-off time) of the video display apparatus 1 can be changed by the user as appropriate and can be set at 24 hours, one week, one month, three months, or the like.

Alternatively, the deadline of the allowable non-operation time may be set in a regular manner at AM 7:00 of every day, AM 7:00 of every Sunday, AM 7:00 of the first day of every month, or the like.

If it is determined that the detected user non-operation time is longer than the preset allowable non-operation time (Yes at step S103), the process moves to step S104. If not (No at step S103), the process returns to step S102.

At step S104, the video display apparatus (TV receiver) 1 is powered on. At step S105, an inquiry picture 40 is displayed on the video display module (display screen) 8 (see FIG. 2). For example, the user can give an instruction to or not to make a communication through the inquiry picture 40.

At step S106, an inquiry remaining time display 41 is displayed on the video display module 8 (see FIG. 2).

At step S107, it is determined whether one, for causing communication making processing of video telephone, e-mail, or the like, of displayed input buttons 43 has been operated by the user. If it is determined that such an operation has been made by the user (Yes at step S107), the process moves to step S108. If not (No at step S107), the process moves to step S110.

At step S108, for example, a TV phone call is made or an e-mail is sent to the preset transmission destination. At step S109, the transmission destination receives, for example, the TV phone call or e-mail.

At step S110, it is determined whether although the inquiry picture 40 (see FIG. 2) is displayed but the time of the inquiry remaining time display 41 has become zero without operation of either of the input buttons 43 by the user. If it is determined that the time of the inquiry remaining time display 41 has become zero without operation of either of the input buttons 43 by the user (Yes at step S110), the process moves to step S108. If not (No at step S110), the process moves to step S111.

At step S111, it is determined whether or not a communication making processing of video telephone, e-mail, or the like, has been OFF operated by the user by using the displayed input buttons 43. If it is determined that such an OFF operation has been made by the user (Yes at step S111), the process moves to step S112. If not (No at step S111), the process returns to step S107.

At step S112, the video display apparatus 1 refrains from making a communication (e.g., making a TV phone call or sending an e-mail) to the preset transmission destination. The process is finished at step S113.

With the above configuration, the embodiment of the invention makes it possible to satisfy both of satisfactory confirmation of safety and protection of privacy.

Although the embodiment employs video telephone in which both of video and audio are communicated, a communication scheme using only video or audio may be employed.

Although the embodiment employs e-mail, other communication schemes such as facsimile and other kinds of packet communication may be employed.

While certain exemplary embodiment has been described, the exemplary embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video display apparatus comprising:
   an inquiry picture output module configured to detect a time for which no operation of the video display apparatus has been made, and to output, to a video display module, an inquiry picture through which an instruction to or not to make a transmission is to be given if the detected non-operation time is longer than a preset time and configured to count an inquiry remaining time for which the inquiry picture has been displayed on the video display module;
   a display time output module configured to display the remaining display time with the inquiry picture on the video display module; and
   a transmitter configured to make the transmission to a preset transmission destination if the instruction to make the transmission is given through the inquiry picture before the inquiry remaining time has become zero or if the inquiry remaining time has become zero without an instruction not to make the transmission.

2. The apparatus of claim 1, wherein the transmitter is not configured to make the transmission to the preset transmission destination if the instruction not to make the transmission is given.

3. The apparatus of claim 1 further comprising:
   a storage unit configured to store the preset time and information relating to the preset transmission destination.

4. The apparatus of claim 1, wherein the transmission is performed by at least one of a television (TV) phone call or an e-mail.

5. The apparatus of claim 1, further comprising:
   a transmitting/receiving unit configured to originate a television (TV) phone call to a preset transmission destination if the instruction to make the transmission is given through the inquiry picture.

6. The apparatus of claim 5, wherein the transmitting/receiving unit originates the TV phone call to the preset transmission destination automatically over a communication network so as to enable a TV phone conversation.

7. A video display method comprising:
   detecting a time for which no operation of the video display apparatus has been made, and displaying, on a video display module, an inquiry picture through which an instruction to or not to make a transmission is to be given if the detected non-operation time is longer than a preset time and counting an inquiry remaining time for which the inquiry picture has been displayed on the video display module;
   displaying the remaining display time with the inquiry picture on the video display module, and
   making the transmission to a preset transmission destination if the instruction to make the transmission is given through the inquiry picture before the inquiry remaining time has become zero or if the inquiry remaining time has become zero without an instruction not to make the transmission.

* * * * *